No. 842,766. PATENTED JAN. 29, 1907.
F. A. CEASE.
NUT LOCK.
APPLICATION FILED OCT. 13, 1906.
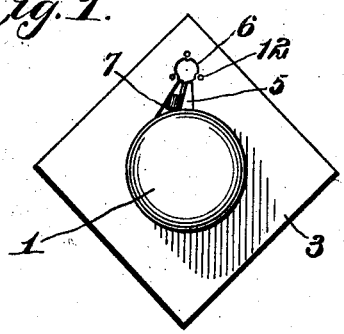
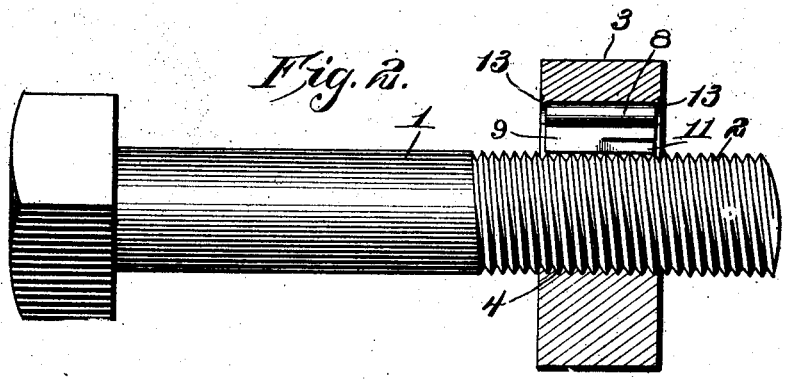
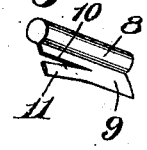
Witnesses
Louis R. Heinrichs
C. C. Hines
Inventor
Frederick A. Cease
By Victor J. Evan

UNITED STATES PATENT OFFICE.

FREDERICK A. CEASE, OF PLYMOUTH, PENNSYLVANIA.

NUT-LOCK.

No. 842,766.     Specification of Letters Patent.     Patented Jan. 29, 1907.

Application filed October 13, 1906. Serial No. 338,809.

*To all whom it may concern:*

Be it known that I, FREDERICK A. CEASE, a citizen of the United States of America, residing at Plymouth, in the county of Luzerne and State of Pennsylvania, have invented new and useful Improvements in Nut-Locks, of which the following is a specification.

This invention relates to nut-locks, its object being to provide simple and effective means for locking a nut against retrograde movement upon a bolt, the construction being such as to adapt the device to be supplied at a low cost and thrown out of operation in a convenient manner to permit the nut to be tightened upon the bolt and removed therefrom when occasion requires.

In the accompanying drawings, Figure 1 is a front elevation of a nut and bolt equipped with my invention. Fig. 2 is a front-to-rear section through the nut, showing the same applied to the bolt, the latter appearing in side elevation. Fig. 3 is a detail view of the locking-key.

Referring to the drawings, the numeral 1 designates a bolt of ordinary construction provided with a threaded portion 2 for the reception of a nut 3. The nut 3 is provided with the usual threaded bore 4 to receive and engage the bolt and in accordance with the present invention is formed with a radial passage 5, communicating at its inner end with said bore and at its outer end with a nearly cylindrical seat or opening 6, extending through the nut from front to rear thereof parallel with the bore 4. One of the side walls 7 of the passage 5 is obliquely inclined for a purpose hereinafter described.

The radial passage and opening are provided for the reception of a locking-key comprising a cylindrical body portion 8, having extending from one side thereof a longitudinal bit 9, which is incised or bifurcated for a portion of its length, as indicated at 10, to form a locking-tongue 11.

In the operation of applying the device for use the nut is first screwed upon the bolt in the usual manner, after which the key is slid endwise into its keeper opening 6 and the tongue 11 bent obliquely laterally, and downwardly to engage the adjacent threads 2 of the bolts 1, the tongue being arranged to bear against the inclined wall 7, whereby it is reinforced to prevent it from bending out of engagement with the threads under strain. After the key has been applied the front and rear faces of the nut adjacent to the ends of the opening 6 are indented, as shown at 12, by means of a punch, thus producing inward projections 13, which engage the ends of the body portion 8 of the key and hold the same from outward movement and displacement.

The lower edge of the entire surface of the bit 9 impinges against the surfaces of the threads 2, but not sufficiently to lock the nut against movement, the locking action being performed by the tongue 11. The tongue will act to firmly and securely hold the nut against retrograde rotation, and the form of the same and the passage 5 is such that a match-stem or suitable tool may be inserted to force the tongue back to a position in line with the body of the bit, thus releasing it from engagement with the threads, so that the nut may be screwed off the bolt when occasion requires, as in disconnecting the parts when repairs are to be made to the tracks of railways.

Having thus described the invention, what is claimed as new is—

In a nut-lock, the combination of a bolt, a nut provided with a radial passage communicating at its inner end with the threaded bore thereof and having at its outer end an opening communicating with the outer end of said passage, and a key comprising a body portion fitted in said opening, and a bit projecting from said body portion into the passage, said bit being incised to form a tongue to engage the threads of the bolt, the body of the nut being provided with projections at the ends of the opening to engage and hold the body of the key from displacement.

In testimony whereof I affix my signature in presence of two witnesses.

FREDERICK A. CEASE.

Witnesses:
    JOHN J. HOWARD,
    GEORGE W. KETTLE.